US009069940B2

(12) United States Patent
Hars

(10) Patent No.: US 9,069,940 B2
(45) Date of Patent: Jun. 30, 2015

(54) SECURE HOST AUTHENTICATION USING SYMMETRIC KEY CRYPTOGRAPHY

(75) Inventor: Laszlo Hars, Lafayette, CO (US)

(73) Assignee: Seagate Technology LLC, Cupertino, CA (US)

( * ) Notice: Subject to any disclaimer, the term of this patent is extended or adjusted under 35 U.S.C. 154(b) by 625 days.

(21) Appl. No.: 12/888,555

(22) Filed: Sep. 23, 2010

(65) Prior Publication Data

US 2012/0079288 A1 Mar. 29, 2012

(51) Int. Cl.
| | | |
|---|---|---|
| G06F 12/14 | (2006.01) | |
| H04L 9/14 | (2006.01) | |
| H04L 9/00 | (2006.01) | |
| G06F 21/30 | (2013.01) | |
| G06F 21/00 | (2013.01) | |
| H04L 9/08 | (2006.01) | |
| H04L 9/32 | (2006.01) | |

(52) U.S. Cl.
CPC ............... *G06F 21/30* (2013.01); *G06F 21/00* (2013.01); *H04L 9/0869* (2013.01); *H04L 9/3228* (2013.01); *H04L 2209/38* (2013.01)

(58) Field of Classification Search
CPC ....... G06F 21/00; G06F 21/30; H04L 9/3228; H04L 9/0869; H04L 2209/38
USPC ......... 713/168, 193; 726/28, 29, 3, 7; 380/44, 380/277; 709/203, 212
See application file for complete search history.

(56) References Cited

U.S. PATENT DOCUMENTS

| | | | |
|---|---|---|---|
| 5,225,664 A | 7/1993 | Iijima | |
| 6,789,177 B2 | 9/2004 | Okada | |
| 6,993,661 B1 * | 1/2006 | Garfinkel | ...................... 713/193 |
| 7,028,908 B2 | 4/2006 | Kuroda et al. | |
| 7,216,235 B1 | 5/2007 | Platt | |
| 7,303,135 B2 | 12/2007 | Nakabe et al. | |
| 2003/0041221 A1 * | 2/2003 | Okada | ........................... 711/164 |
| 2003/0084290 A1 * | 5/2003 | Murty et al. | ................... 713/168 |
| 2004/0123127 A1 * | 6/2004 | Teicher et al. | ................ 713/182 |
| 2005/0262361 A1 * | 11/2005 | Thibadeau | ..................... 713/193 |
| 2006/0015946 A1 * | 1/2006 | Yagawa | ........................... 726/32 |
| 2006/0149969 A1 * | 7/2006 | Song | .............................. 713/182 |
| 2006/0191021 A1 | 8/2006 | Jeong et al. | |
| 2007/0300052 A1 * | 12/2007 | Jevans | ............................... 713/1 |
| 2008/0155276 A1 * | 6/2008 | Chen et al. | .................... 713/193 |
| 2008/0219449 A1 * | 9/2008 | Ball et al. | ....................... 380/277 |
| 2008/0235809 A1 * | 9/2008 | Weinstein et al. | .............. 726/28 |
| 2009/0052670 A1 * | 2/2009 | You et al. | ....................... 380/277 |
| 2009/0138727 A1 * | 5/2009 | Campello de Souza | ...... 713/193 |
| 2009/0282245 A1 * | 11/2009 | Farrugia et al. | ................ 713/168 |
| 2010/0017626 A1 * | 1/2010 | Sato et al. | ...................... 713/193 |

(Continued)

*Primary Examiner* — David García Cervetti
*Assistant Examiner* — Shanto M Abedin
(74) *Attorney, Agent, or Firm* — Cesari & Reed LLP; Kirk A. Cesari; Christian W. Best

(57) ABSTRACT

Methods of securely authenticating a host to a storage system are provided. A series of authentication sessions are illustratively performed. Each of the authentication sessions includes the host transmitting an authentication request to the storage system. The storage system authenticates the host based at least in part upon a content of the authentication request. After each successful authentication of the host to the storage system, an encryption key that was utilized in encrypting the authentication request that was transmitted to the storage system is deleted. After each encryption key deletion, a new encryption key that is different than the previous key is optionally stored and is utilized in the next authentication session.

16 Claims, 9 Drawing Sheets

(56) References Cited

U.S. PATENT DOCUMENTS

2010/0306555 A1* 12/2010 Sasahara et al. ............. 713/193
2011/0154060 A1* 6/2011 Guyot et al. ................. 713/193
2011/0239004 A1* 9/2011 Hayashi et al. .............. 713/189

* cited by examiner

SECURE HOST AUTHENTICATION USING SYMMETRIC KEY CRYPTOGRAPHY

BACKGROUND

It is commonly desirable to restrict access to information stored in a data storage system. For example, a data storage system may have private business or personal information stored therein.

One method of restricting access to data storage systems includes requiring the use of an authentication key such as a password. Password systems require that the person or device trying to access the data storage system authenticate themselves by supplying the correct password. Once the person or device is authenticated, the storage system will respond to read and/or write commands from the authenticated user. In some instances, these types of systems may help to restrict access. However, "password only" systems are vulnerable to being accessed by system attackers or others who should not have access to the data storage system. For example, a person may be able to intercept and record the transmission of a password to a data storage system. The person could then recover the password from the recorded transmission and supply it to the data storage system to gain access to its contents.

Other methods of restricting access to data storage systems have developed. Some of these methods include utilizing public key cryptography and Diffe-Hellman type key exchanges. These methods may improve security over systems such as "password only" systems. However, some of these methods may still be vulnerable to access by system attackers and others.

SUMMARY

An aspect of the disclosure relates to securely authenticating a host to a storage system. In one embodiment, a series of authentication sessions are performed. Each of the authentication sessions includes the host transmitting an authentication request to the storage system. The storage system authenticates the host based at least in part upon a content of the authentication request. After each successful authentication of the host to the storage system, an encryption key that was utilized in encrypting the authentication request that was transmitted to the storage system is deleted. After each encryption key deletion, a new encryption key that is different than the previous key is optionally stored and is utilized in the next authentication session.

These and various other features and advantages that characterize the claimed embodiments will become apparent upon reading the following detailed description and upon reviewing the associated drawings.

DETAILED DESCRIPTION

Embodiments of the present disclosure include methods of securely authenticating a host to a data storage system utilizing symmetric key cryptography and hash functions. Symmetric key cryptography and hash functions are illustratively less computationally intense than other methods such as those that use public key cryptography or Diffie-Hellman type key exchange. This may improve the performance of a system by reducing the amount of time required for encrypting and decrypting information and by reducing the amount of system resources used in encrypting and decrypting. This may also enable certain embodiments to be practiced in environments that may not otherwise be capable of performing a secure host authentication (e.g. due to limited processing power or memory).

Embodiments of the present disclosure may also improve the security of a data storage system by reducing the likelihood of a system attacker gaining access. For instance, in one embodiment, an authentication process only uses a particular encryption key for one authentication, and subsequent authentications require a new encryption key. Accordingly, if an authentication message to a data storage system is intercepted and recorded, it will not enable an attacker to later access the data storage system by replaying the intercepted message. Later access to the system will require a message to be sent that is encrypted with a different key.

Additionally, certain embodiments of the present disclosure may improve the security of a data storage system by removing previously used keys from the data storage system. For instance, a system attacker may intercept and record transmissions between a host and a data storage system. The system attacker may later steal the data storage system. If previously used keys were remaining in the data storage system, the system attacker may be able to retrieve the keys. The system attacker could then use the keys to decrypt the intercepted and recorded transmissions. Those transmissions may include an encrypted authentication key. In such a case, the attacker could decrypt the authentication key and gain full access to the system. However, if the storage system only stores one key and the one key has never been used to transmit the authentication key, the attacker will be less likely to be able to use the one key and the recorded transmissions to recover the authentication key.

Figure 1:
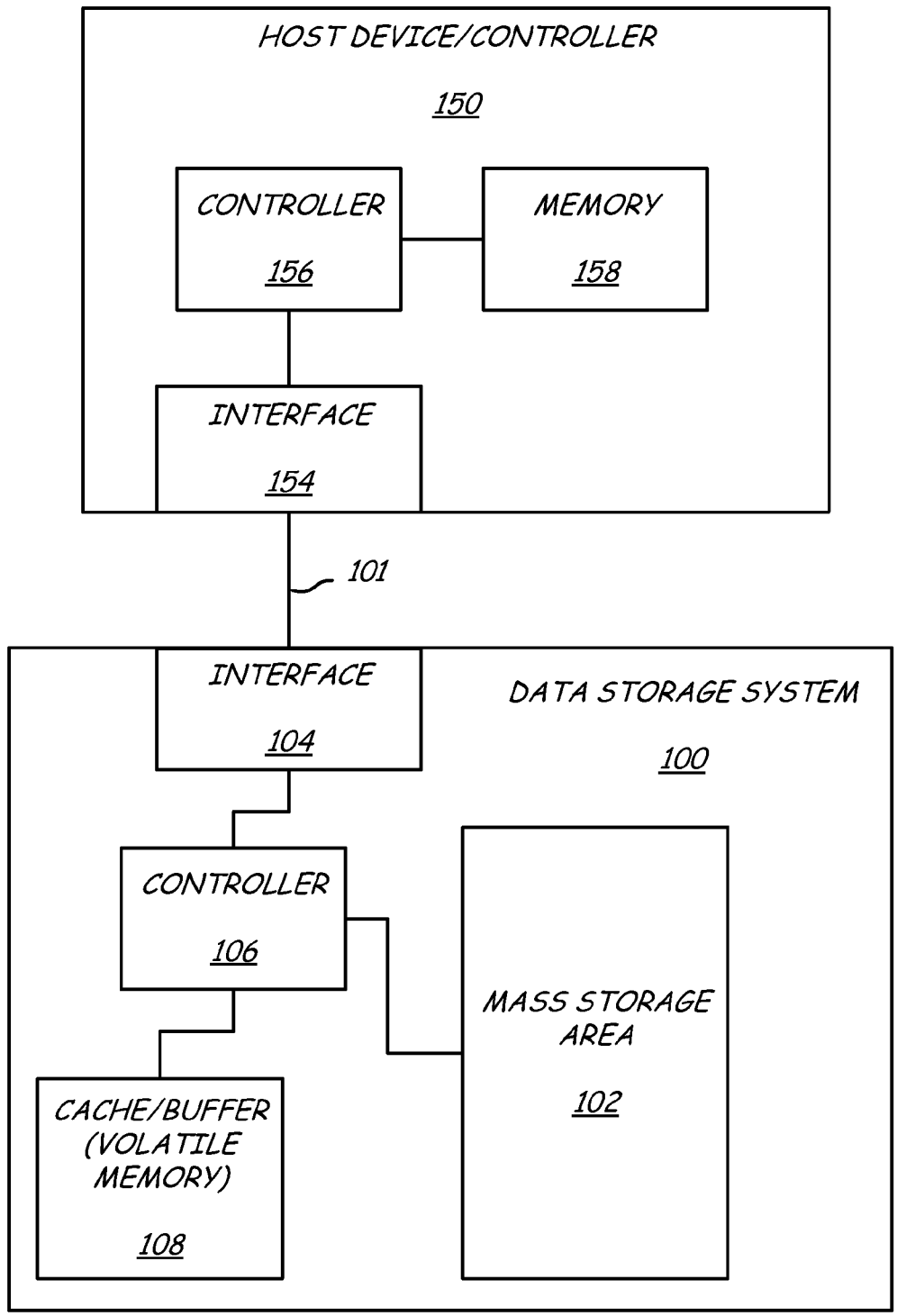
FIG. 1 is a block diagram of a data storage system communicatively coupled to a host device/controller.

Embodiments of the present disclosure have further features that may improve performance or improve security. However, before further describing embodiments, it is worthwhile to first describe an illustrative operating environment in which some embodiments may be incorporated. The operating environment shown in FIG. 1 is for illustration purposes only. Embodiments are not limited to any particular environment and are optionally practiced within any number of different types of operating environments.

FIG. 1 is a block diagram of a data storage system 100 communicatively coupled to a host device/controller 150. Storage system 100 illustratively has an interface 104 that is coupled to an interface 154 of host 150 such that information or data can be exchanged or sent back and forth between host 150 and storage system 100. FIG. 1 shows storage system 100 and host 150 as being directly connected through a physical connection 101. Storage system 100 and host 150 are also illustratively indirectly connected such as, but not limited to, through a Virtual Private Network or the Internet. Storage system 100 and host 150 may also be connected and communicate wirelessly instead of or in conjunction with a wired or physical connection. Furthermore, FIG. 1 shows storage system 100 and host 150 as being physically separate devices. In an embodiment, storage system 100 and host 150 are integrated onto a single printed circuit board or a single piece of silicon such that they are one integral unit. In such a case, controller 106 of storage system 100 and controller 156 of host 150 are illustratively directly communicatively coupled instead of being coupled through one or more interfaces such as those shown in FIG. 1.

Data storage system controller 106 illustratively controls or manages the storing or encoding of data to data storage area 102 and the retrieval or decoding of data from data storage area 102. Storage area 102 is not limited to any particular type of storage device and illustratively includes any one or more type of storage media. Examples of storage media, for illustration purposes only and not by limitation, include magnetic discs, optical discs, solid state cells (e.g. flash memory cells), and phase change memory cells.

Controller 106 optionally uses volatile memory component 108 in storing or retrieving information from storage area 102. For example, controller 106 is illustratively configured to write a specific amount of data to storage area 102 per each write/program cycle. In such a case, controller 106 stores data to volatile memory 108 until the appropriate amount of data is accumulated, and controller 106 then transfers data from memory 108 to storage area 102. Also, as is described in greater detail below, controller 106 and memory 108 are illustratively used in encryption processes to provide data security for storage system 100. For instance, memory 108 can store data or instructions for encrypting/decrypting data, and controller 106 can process or execute the data or instructions.

Host 150 illustratively includes a memory component 158. Memory 158 is optionally volatile (e.g. RAM) and/or non-volatile (e.g. flash) memory. In an embodiment, memory 158 includes data or instructions for encrypting/decrypting data or for otherwise providing data security features, and controller 156 process or executes the data or instructions.

Host 150 is not limited to any particular type of device. In one embodiment, host 150 is an electronic device such as, but not limited to, a personal computer, a cell phone, a camera, a music player, a gaming device, or a personal digital assistant. In such a case, host 150 illustratively uses data storage system 100 as an external storage device (e.g. a mass storage device). In another embodiment, host 150 is a memory controller. For instance, host 150 illustratively connects to one or more data storage systems such as storage system 100 and presents the data storage systems to another electronic device as one logical unit/volume.

As has been previously mentioned, FIG. 1 is merely one illustrative operating environment. Embodiments of the present disclosure are not limited to any particular environment such as the one shown in FIG. 1. Embodiments are illustratively practiced within any number of different types of operating environments.

Figure 2:
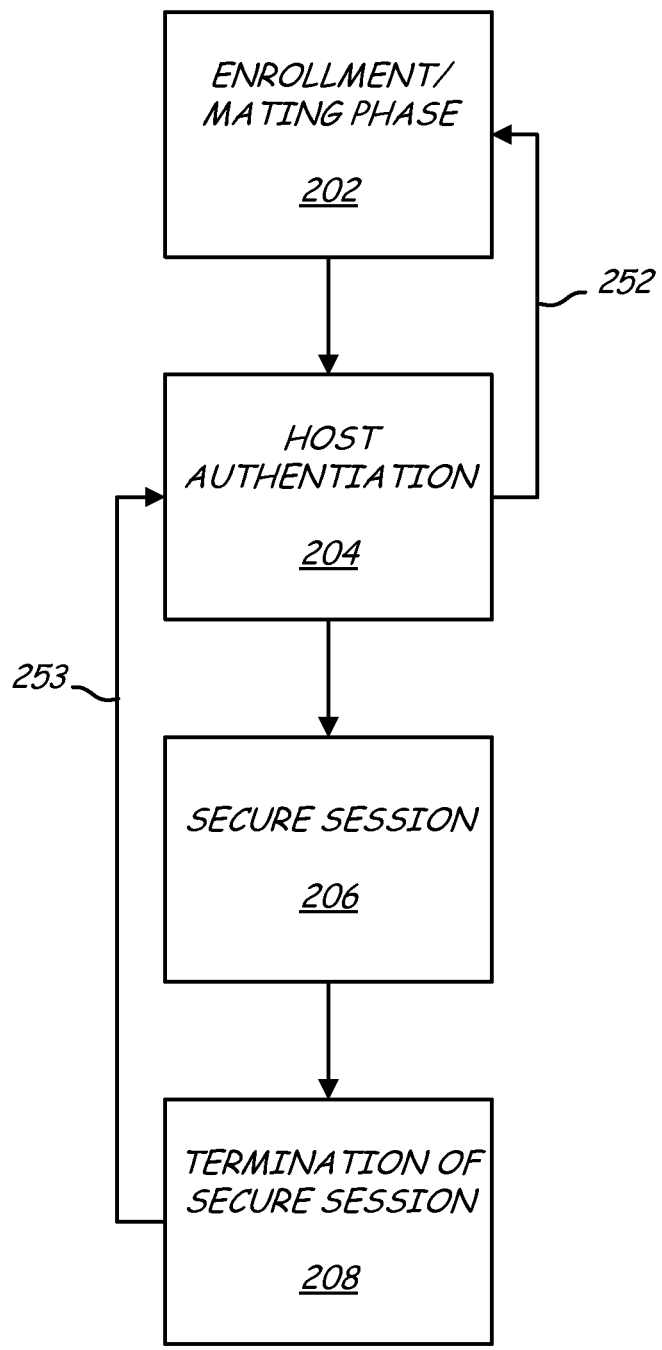
FIG. 2 is a block diagram of illustrative phases associated with a host securely exchanging information with a storage system.

FIG. 2 is a block diagram of illustrative phases associated with a host securely exchanging information with a storage system. At block 202, the host and storage system share information or secrets in an enrollment/mating phase. The mating phase is illustratively performed in a secure environment such that information exchanged or shared between the host and the data storage system is safe from a system attacker or other person/device intercepting the information. For example, for illustration purposes only and not by limitation, the host and the data system may be physically protected to prevent unauthorized access. The shared information may include any information that is used in subsequent phases.

In one embodiment, the information exchanged at the mating phase includes an authentication key such as, but not limited to, a password. As is described in further detail below, the authentication key is illustratively used to authenticate a host. The storage system optionally applies a cryptographic hash function to the authentication key and stores the hash value of the authentication key such that the hash value is the only indication of the authentication key stored in the storage system. Illustrative embodiments of cryptographic hash functions include SHA-0, SHA-1, and SHA-2 (i.e. SHA-224, SHA-256, SHA-384, and SHA-512). Embodiments of cryptographic hash functions are not however limited to any particular functions. The storage system optionally stores the authentication key or hash value of the authentication key in volatile memory. However, in other embodiments, the values are stored in any memory such as in a non-volatile memory component.

It is worth highlighting that only storing the hash value of the authentication key in the storage system may provide increased security over systems in which the authentication key itself is stored in the storage system. For instance, in an embodiment, after the enrollment/mating phase, the storage system is placed in an environment in which a system attacker may have access to the storage system or may even be able to steal the storage system. By only storing the hash value and not the authentication key, it may be difficult or practically impossible for a system attacker to determine the authentication key based on the hash value. Additionally, storing the authentication key or the hash value in volatile memory may also increase security. For instance, if a system attacker steals the storage drive in such a manner that power to the system is lost, then the authentication key or hash value will be lost from the volatile memory.

The enrollment/mating phase at block 202 further illustratively includes the host and storage system exchanging or sharing information to establish a symmetric key cryptographic relationship. For instance, in an embodiment, the host and storage system share algorithms or other values or formulas such that they can each decrypt information sent from the other. In one embodiment, the host and storage system decrypt and encrypt information using identical or trivially related keys (e.g. keys related by a simple transform function). One illustrative cryptographic relationship includes utilizing the Advanced Encryption Standard. Embodiments are not however limited to any particular standard or methods, and include all standards and methods.

Finally in reference to the enrollment/mating phase at block 202, the host and the storage drive illustratively exchange or share a first random key, X1. X1 is optionally generated by either the host or the storage system. X1 may however also be generated by another component or device and be retrieved by either the host or storage system. X1 is illustratively a randomly generated key that both the host and storage device can use to encrypt and decrypt information. In an embodiment, similar as to was mentioned with the authentication key, the data storage system stores X1 in volatile memory such that the encryption key is lost from its memory if it loses power.

At block 204, the storage system authenticates the host. One exemplary result of authenticating the host is that the host and storage system establish a key that is used in exchanging information in the following secure session. In an authentication phase, the host is illustratively in a secure environment such that it cannot be tampered with (e.g. by a system attacker), and the data storage system is illustratively in an unsecured environment. In an embodiment, a data storage system includes tamper detection such that it is able to detect and communicate to a host if the physical housing of the storage system has been opened or otherwise interfered with. In such a case, the host illustratively discontinues exchanging information with the storage system or provides an alert or notification that the storage system may have been compromised. In another embodiment, the data storage system tamper detection also provides for the storage system to be able to detect and report if it has been taken off-line (e.g. communications between host and storage system have been interrupted). The host similarly illustratively interrupts or discontinues exchanging information with the storage system or optionally provides an alert or notification in response the storage system being taken off-line. Several illustrative methods of authenticating a host are described in detail below and shown in FIGS. 3, 4, 5, 6, 7, and 9.

If the host is not successfully authenticated at block 204 (e.g. the authentication is aborted), the process illustratively returns to the enrollment/mating phase at block 202. This is represented by line 252. In another embodiment, the process illustratively returns to the beginning of the authentication process.

If the host is successfully authenticated at block 204, the process continues to block 206. At block 206, the host and storage system exchange information or data in a secure session. The host and storage system illustratively use the key that was determined or established at block 204.

At block 208, the secure session is terminated. The session is illustratively terminated based on a predetermined time duration, based on a predetermined amount of information transfer, based on inactivity, or based on either the host or storage system going off-line. Embodiments of the present disclosure are not however limited to any particular methods of terminating a secure session.

After the secure session has been terminated, the process illustratively returns to block 204 where the host is again authenticated before beginning another secure information exchange session. This is indicated by line 253. In another embodiment, the process illustratively returns to the enrollment/mating phase at block 202. This may be necessary in some situations such as when the data storage system, the host, or both lose power following a secure session. For example, if the data storage system loses power after a secure session, it may lose its key or its authentication key hash value. Returning to the enrollment/mating phase is illustratively used to replace the lost values.

Figure 3:
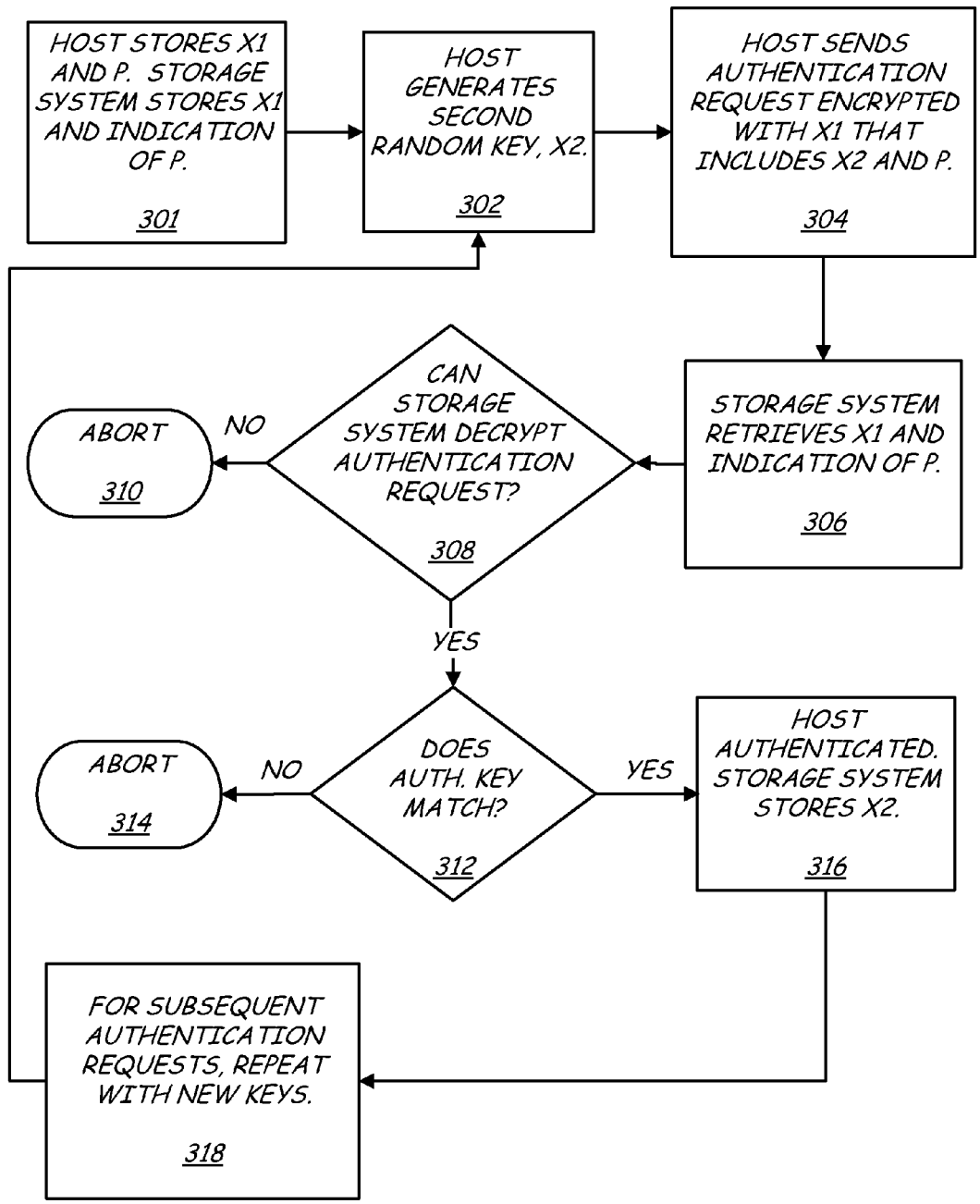
FIG. 3 is a block diagram of a method of securely authenticating a host to a data storage system in which the host generates keys.

FIG. 3 is a block diagram of a method of securely authenticating a host to a data storage system. The method shown in FIG. 3 is illustratively used in a process such as that shown in FIG. 2. The method of FIG. 3 is not however limited to being practiced in any particular process and is illustratively used in processes other than the one shown in FIG. 2.

At block 301, the host and data storage system complete an enrollment/mating phase such as the one shown at block 202 in FIG. 2. The host and storage system illustratively both store a first random key, X1. The host also illustratively stores an authentication key, P, and the data storage system illustratively stores the authentication key or an indication of the authentication key (e.g. a hash of the authentication key).

At block 302, the host generates and stores a second random key, X2. X2 is illustratively an encryption key that can be used by the host and by the storage system for encryption/decryption.

At block 304, the host sends an authentication request to the data storage system. The authentication request is illustratively encrypted using the first random key, X1, and includes the second random key, X2, and the authentication key, P. In an embodiment, the authentication key, P, and the second random key, X2, are concatenated before being encrypted.

At block 306, the storage system retrieves the first random key, X1, and the indication of the authentication key, P, that it stored in its memory at the enrollment/mating phase.

At block 308, the storage system attempts to decrypt the authentication request utilizing the first random key, X1. If the storage system is unable to decrypt the authentication request, the method continues to block 310 where the authentication process is aborted and the host is not authenticated. If the storage system is able to decrypt the authentication request, the storage system decrypts the authentication request and retrieves the second random key, X2, and the authentication key, P. The method then continues to block 312.

At block 312, the storage system compares the authentication key from the authentication request to its previously stored indication of the authentication key. For instance, in an embodiment in which the storage system stores a hash value of the authentication key, the storage system computes or calculates the hash value of the authentication key and compares it to the previously stored hash value. If the authentication key and the indication of the authentication key do not match (e.g. the hash values are not the same), the method continues to block 314 where the current authentication process is aborted and the host is not authenticated. If the authentication key and the indication of the authentication key do match (e.g. the hash values are the same), the method continues to block 316.

At block 316, the host is authenticated. The storage system illustratively deletes the first storage key, X1, from its memory and stores the second storage key, X2, that was sent encrypted within the authentication request. The storage system optionally sends a confirmation message to the host that it is authenticated and that it may begin a secure information exchange session such as at block 206 in FIG. 2. The host and storage system illustratively use X2 in the secure session.

As indicated by block 318, for subsequent authentication operations, blocks 302-316 are essentially repeated. The difference however is that new random keys are utilized. For example, in the next authentication operation, the host generates a third random key, X3. The host encrypts the authentication key and X3 utilizing the second random key, X2. The storage system decrypts the authentication request utilizing its copy of X2 stored at block 316. If the authentication is successful, the storage system deletes its copy of X2 and replaces it with X3. This process then continues likewise repeating blocks 302 through 318 for each successful authentication. For example, in the next authentication operation, the host generates a fourth random key, X4, and sends it in an authentication request that is encrypted with X3.

Figure 4:
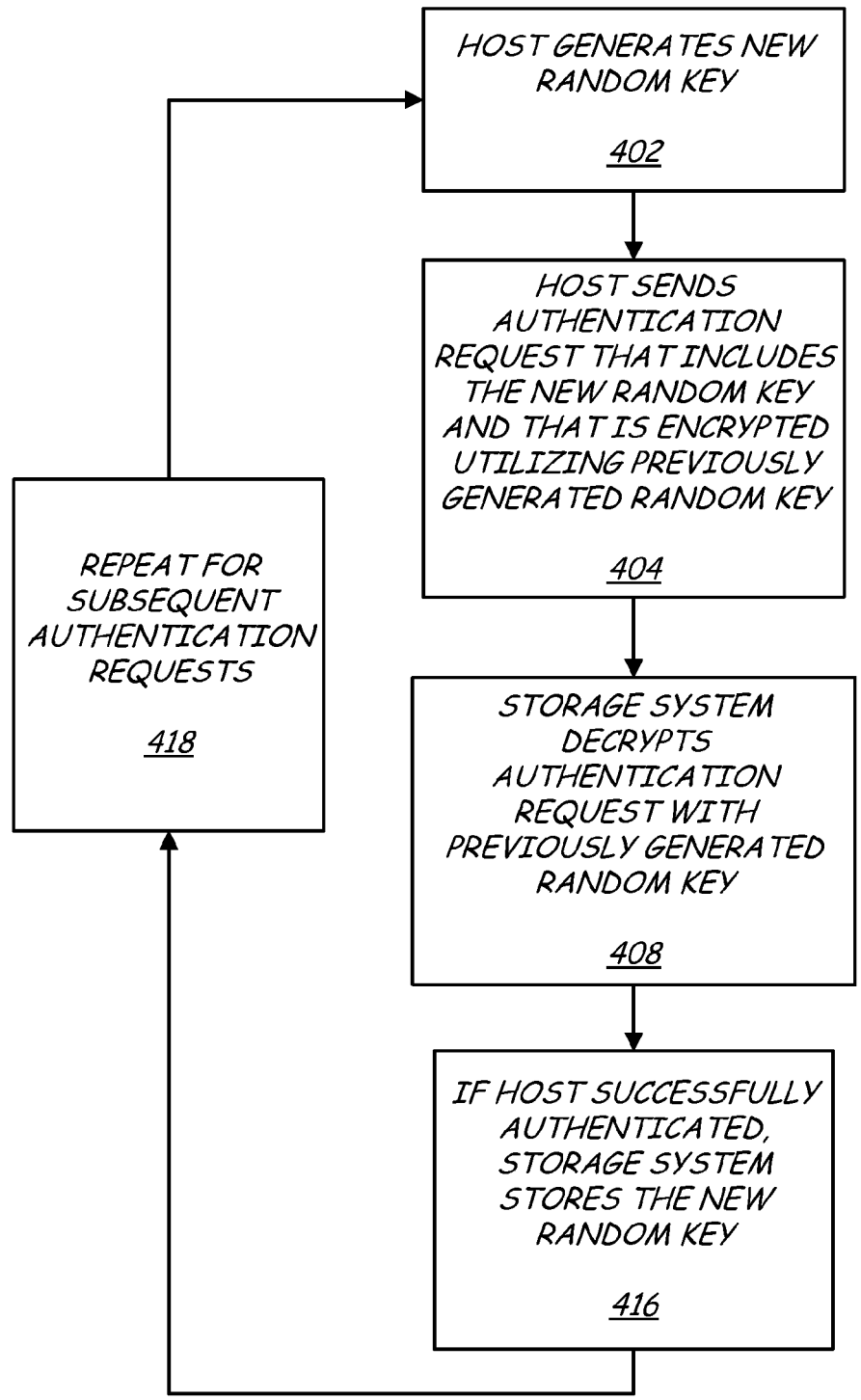
FIG. 4 is a block diagram of key generation and usage in the method of FIG. 3.

FIG. 4 is a block diagram that illustrates the random key generation and usage process described above. Blocks 402, 404, 408, 416, and 418 correspond to blocks 302, 304, 308, 316, and 318 in FIG. 3, respectively. At block 402, the host generates a new random key. At block 404, the host sends an authentication request to the storage system. The authentication request includes the new random key, and the authentication request is encrypted utilizing the previously generated random key. At block 408, the storage system retrieves the previously generated random key and utilizes it to decrypt the authentication request. At block 416, if the authentication operation is successful, the storage system illustratively deletes the previously generated random key and replaces it with the new random key. As indicated by block 418, the process is then repeated for subsequent authentication requests.

As can be seen from the methods described in reference to FIGS. 3 and 4, every authentication session is unique. For example, each authentication request is encrypted using a different random key. Accordingly, if a system attacker intercepts and records an authentication request, the system attacker will not be able to later playback the recorded authentication request to access the storage drive. Additionally, as has been previously described, the storage system optionally only stores a key that has not been used in a host authentication. Accordingly, if a system attacker steals the storage system and retrieves the stored key, the attacker will not be able to use it to decrypt any transmission that would have included the authentication key.

Figure 5:
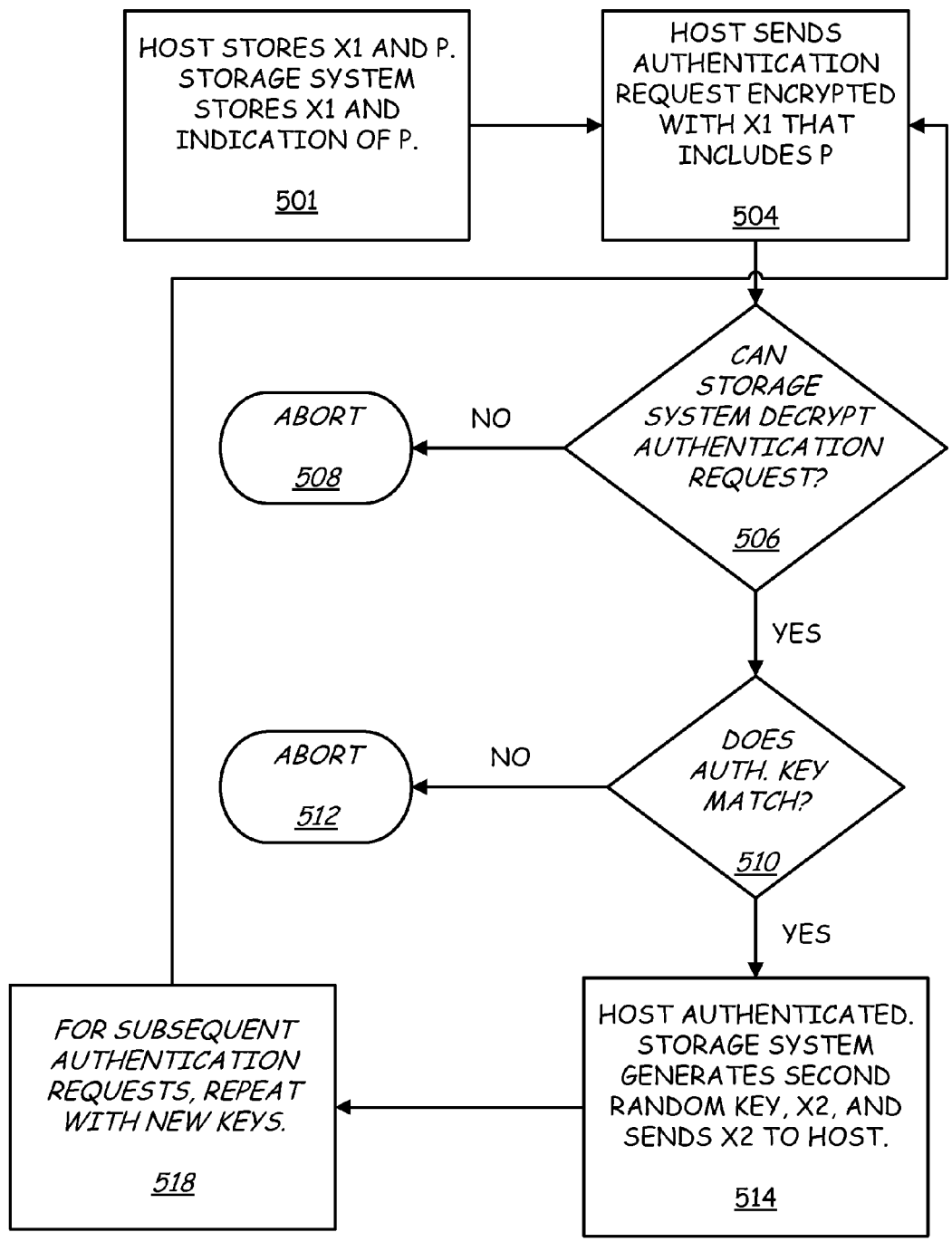
FIG. 5 is a block diagram of a method of securely authenticating a host to a data storage system in which the storage system generates keys.

FIG. 5 is a block diagram of another method of securely authenticating a host to a data storage system. In the methods shown in FIGS. 3-4, the host generates subsequent random keys. In the method shown in FIG. 5 and also in the method shown later in FIG. 6, the storage system illustratively generates subsequent random keys.

At block 501, a host and a data storage system both store a first random key, X1. Additionally, the host may store an authentication key, P, and the data storage system may store an indication of the authentication key, P. These steps illustratively occur in an enrollment/mating operation such as that shown at block 202 in FIG. 2.

At block 504, the host sends an authentication request to the storage system. The authentication request illustratively includes the authentication key, P, and is encrypted utilizing the first random key, X1.

At block 506, the storage system attempts to decrypt the authentication request utilizing the first random key, X1, that it stored at block 501. If the storage system is not able to decrypt the authentication request, the method goes to block 508 where the authentication process is aborted and the host is not authenticated. If the storage system is able to decrypt the authentication request, the method goes to block 510.

At block 510, the storage system retrieves the authentication key, P, sent in the authentication request. The storage system then compares that authentication key to its previously stored indication of the authentication key. If the authentication key and the indication of the authentication key do not match, the method goes to block 512 where the authentication process is aborted and the host is not authenticated. If the authentication key and the indication of the authentication key do match, the method goes to block 514.

At block 514, the host is authenticated and is allowed to continue to a secure information exchange session (e.g. block 206 in FIG. 2). The storage system illustratively generates a second random key, X2, that it sends to the host. The storage system and host optionally delete the previous random key, X1, and replace it with X2. X2 is illustratively used in the secure session.

As indicated by block 518, for subsequent authentication operations, blocks 504-514 are essentially repeated. The difference however is that new random keys are utilized. For example, in the next authentication request, at block 504, the host sends the authentication request encrypted with X2 instead of X1, and at block 514, the storage system generates a new key X3 instead of X2. X2 is then illustratively deleted and replaced with X3. This process continues likewise for subsequent host authentications.

Figure 6:
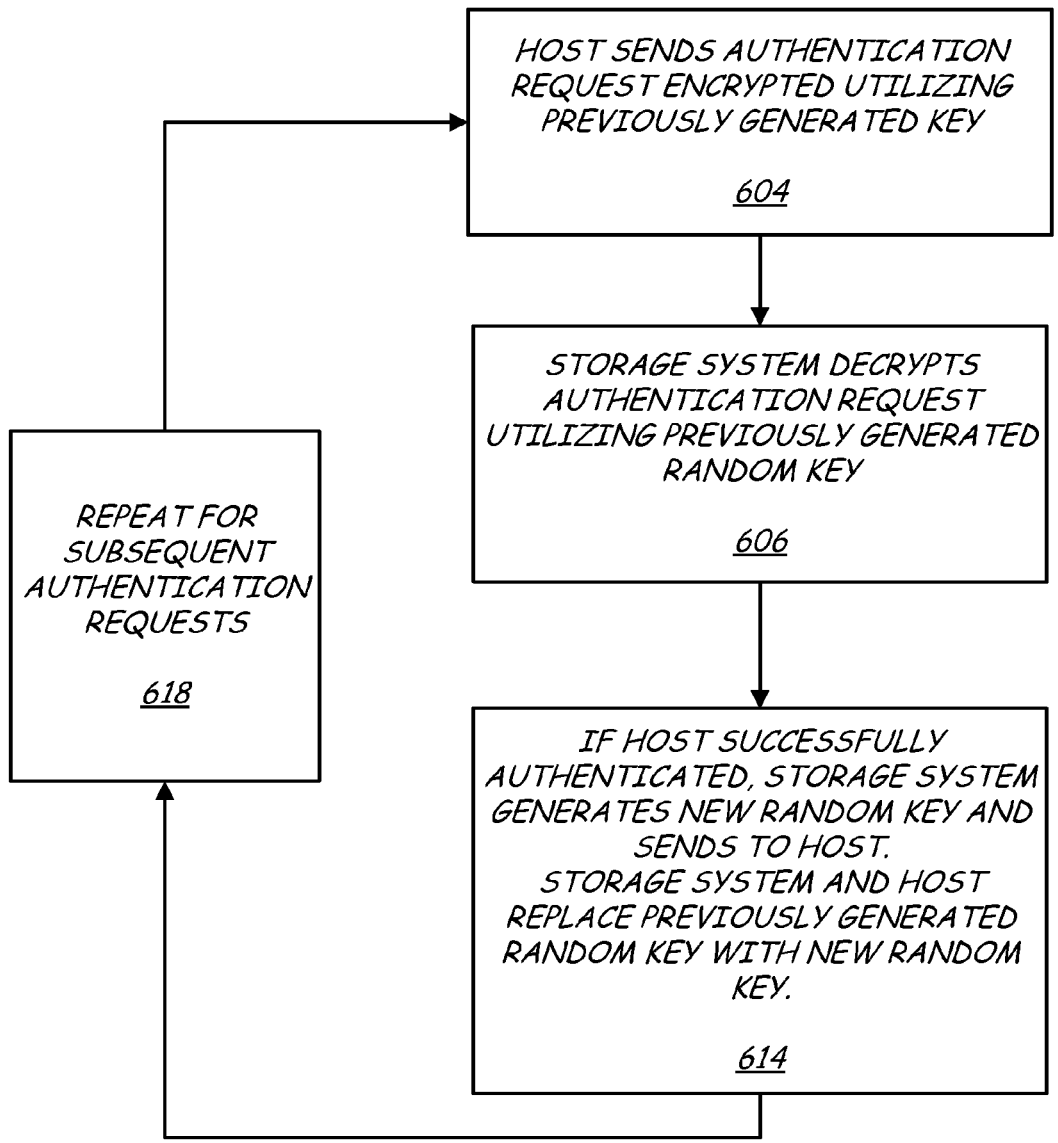
FIG. 6 is a block diagram of key generation and usage in the method of FIG. 5.

FIG. 6 is a block diagram that illustrates the random key generation and usage process described above. Blocks 604, 606, 614, and 618 correspond to blocks 504, 506, 514, and 518 in FIG. 5, respectively. At block 604, the host sends an authentication request to the data storage system. The authentication request is illustratively encrypted utilizing a previously generated and stored random key. At block 606, the storage system attempts to decrypt the authentication request utilizing its previously generated and stored random key. At block 614, if the storage system successfully decrypts the authentication request, the storage system generates a new random key that it sends to the host. The storage system and host illustratively delete the previously generated random key and replace it with the new random key. As indicated by block 618, the process is then repeated for subsequent authentication requests.

The methods shown in FIGS. 5 and 6 have some similarities to the methods shown in FIGS. 3-4. For example, a system attacker cannot intercept and record an authentication request and then later replay the intercepted authentication request to access the storage system. Also for example, the storage system only stores a key that has not been used in a transmission to encrypt the authentication key. The methods in FIGS. 5 and 6 may also provide additional benefits. As was previously mentioned, in the methods in FIGS. 5 and 6, the storage system generates the random keys instead of the host. This is advantageous in that it provides additional flexibility in implementing secure host authentication methods that utilize symmetric key cryptography. For instance, for illustration purposes only and not by limitation, it may be desirable to use such a method in a system having a host that does not have the capability to generate random keys. In such a case, a data storage system having random key generation capability can be used, and the host can still be securely authenticated despite its inability to generate random keys.

Figure 7:
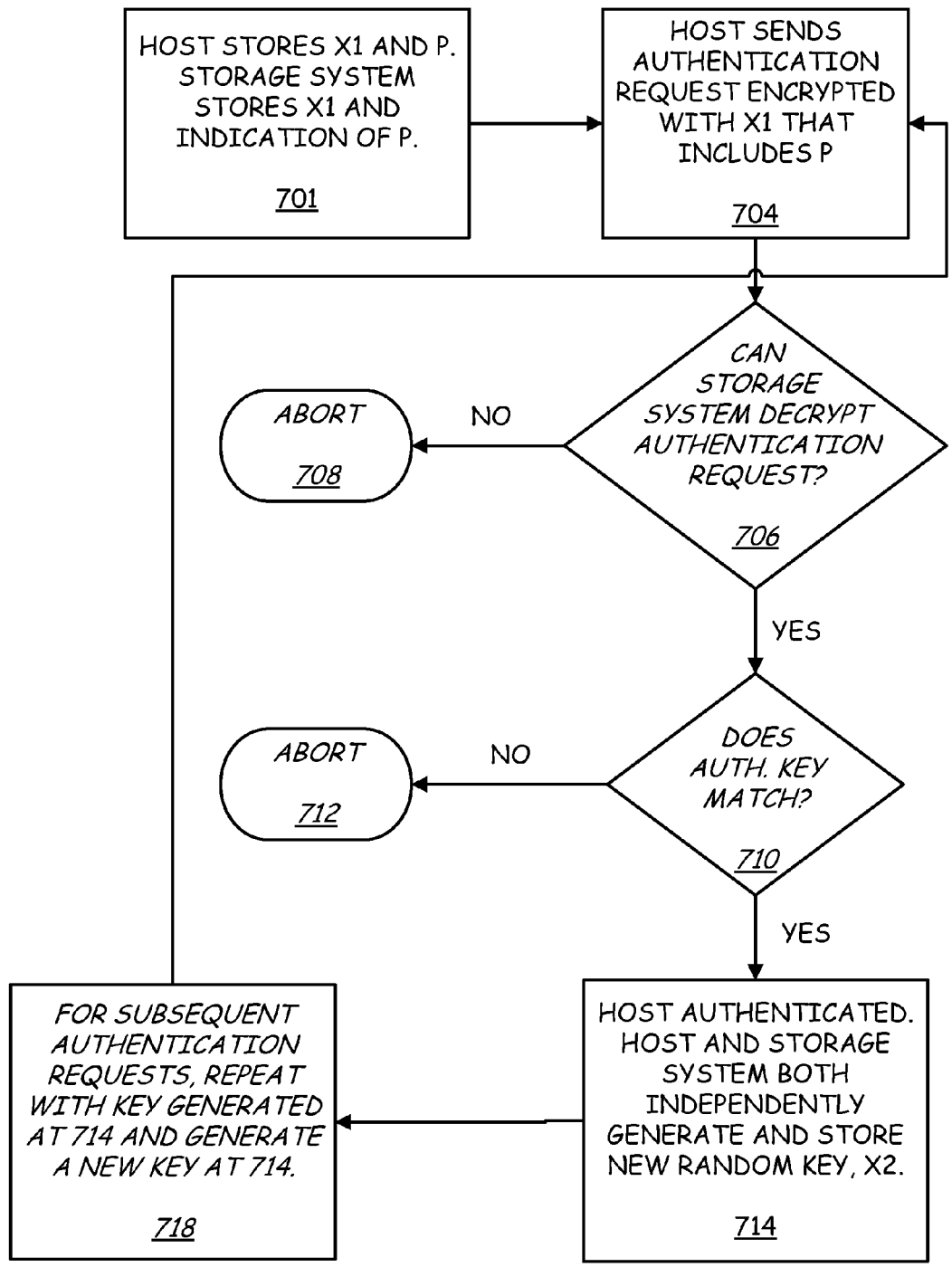
FIG. 7 is a block diagram of a method of securely authenticating a host to a data storage system in which both the host and storage system generate keys.

FIG. 7 is a block diagram of another method of securely authenticating a host to a data storage system. In the method of FIG. 7, both the host and the storage system generate keys. As will become evident after the discussion of the method, one advantage of the method is that it does not require any keys to be transferred between the host and the storage system. This illustratively provides additional security for an authentication process. For example, if a system attacker intercepts and records transmissions between the host and the storage system, the attacker may not have information that includes the keys to encrypt or decrypt transmissions exchanged between the host and storage system.

In the method shown in FIG. 7, blocks 701, 704, 706, 708, 710, and 712 are the same or similar as blocks 501, 504, 506, 508, 510, and 512 in FIG. 5, respectively. The methods differ starting at block 714. At block 714, the host and the data storage system both generate a new key, X2, that is based at least in part on the first random key, X1. The new key, X2, is illustratively a hash value of the first key, X1. In an embodiment, methods such as those previously described in relation to finding a hash value for an authentication key (e.g. SHA2) are used. In one embodiment, the random key and/or subsequent new keys are padded before determining a hash value. For instance, for illustration purposes only and not by limitation, null bytes are added to source bytes to make a padded key that is of an appropriate byte size for determining a hash value. After both the host and storage system have generated the new key, X2, they illustratively delete the first key, X1, and store new key, X2, which is optionally used in a following secure session.

As indicated by block 718, the next authentication request illustratively repeats blocks 704-714 using the key generated at step 714 in place of the previously used key. For example, in the second host authentication, the host and data storage system illustratively hash X2 to generate X3. In the third host authentication, X3 is hashed to generate X4. This process is continued for subsequent authentication requests.

The method in FIG. 7 has many of the benefits of the methods previously discussed. For instance, the storage system only stores a key that has not been used to encrypt a transmitted authentication key. Additionally, as was previously mentioned, the method in FIG. 7 does not require that any keys be transferred between the host and storage system during an authentication operation. Instead, the host and storage system each independently generates a copy of the same key that they use for an authentication. Accordingly, if a system attacker intercept and records transmissions, the attacker will have even less key information. This illustratively makes it more difficult for the attacker to reconstruct any keys used in the method including the key needed for the next authentication request.

Figure 8:
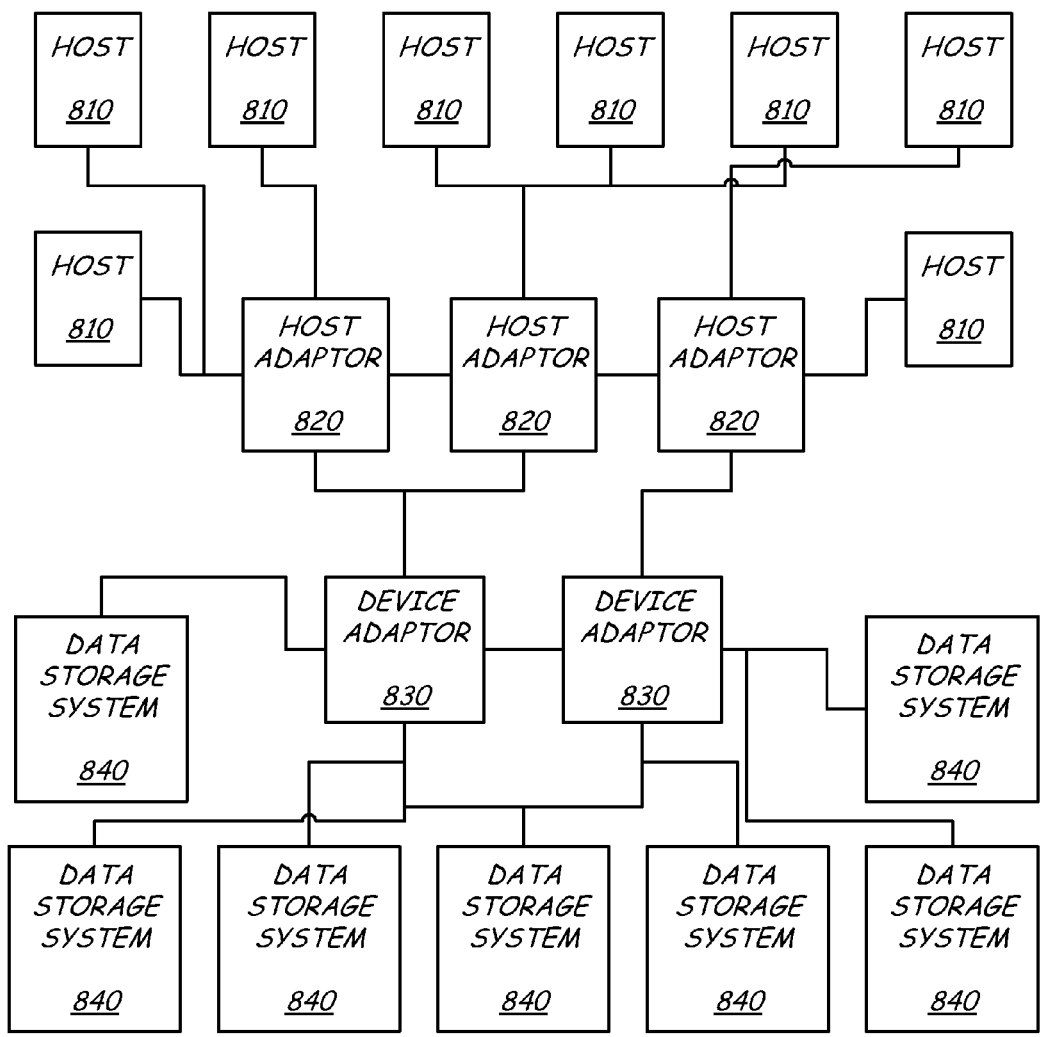
FIG. 8 is a block diagram of data storage systems indirectly coupled to hosts through device adaptors and host adaptors.

FIG. 8 is a block diagram of another illustrative operating environment in which some embodiments disclosed herein may be practiced. In FIG. 8, hosts 810 are not connected directly to data storage systems 840. Instead, hosts 810 are connected to host adaptors 820. Data storage systems 840 are connected to device adaptors 830, and device adaptors 830 are connected to host adaptors 820. In other words, hosts 810 are connected indirectly to storage systems 840 through host adaptors 820 and device adaptors 830. In an embodiment, the environment shown in FIG. 8 is implemented as a storage area network or "SAN." Hosts 810 are optionally computer servers, but are not limited to any particular hardware or software configuration. Storage systems 840 are illustratively storage systems like system 100 in FIG. 1 such as, but not limited to, solid state drives or hard disc drives. Device adaptors 830 are illustratively disk array controllers or RAID controllers, and host adaptors 820 are illustratively host controllers or host bus adaptors Like FIG. 1, FIG. 8 is for illustration purposes only and embodiments are not limited to any particular operating environment. Embodiments of the present disclosure are illustratively practiced in systems or networks having any number of hosts 810, host adaptors 820, device adaptors 830, and storage systems 840. Additionally, embodiments of the present disclosure are not limited to any particular connection scheme amongst the various network components. Embodiments are practiced in networks having any connection scheme.

Figure 9:
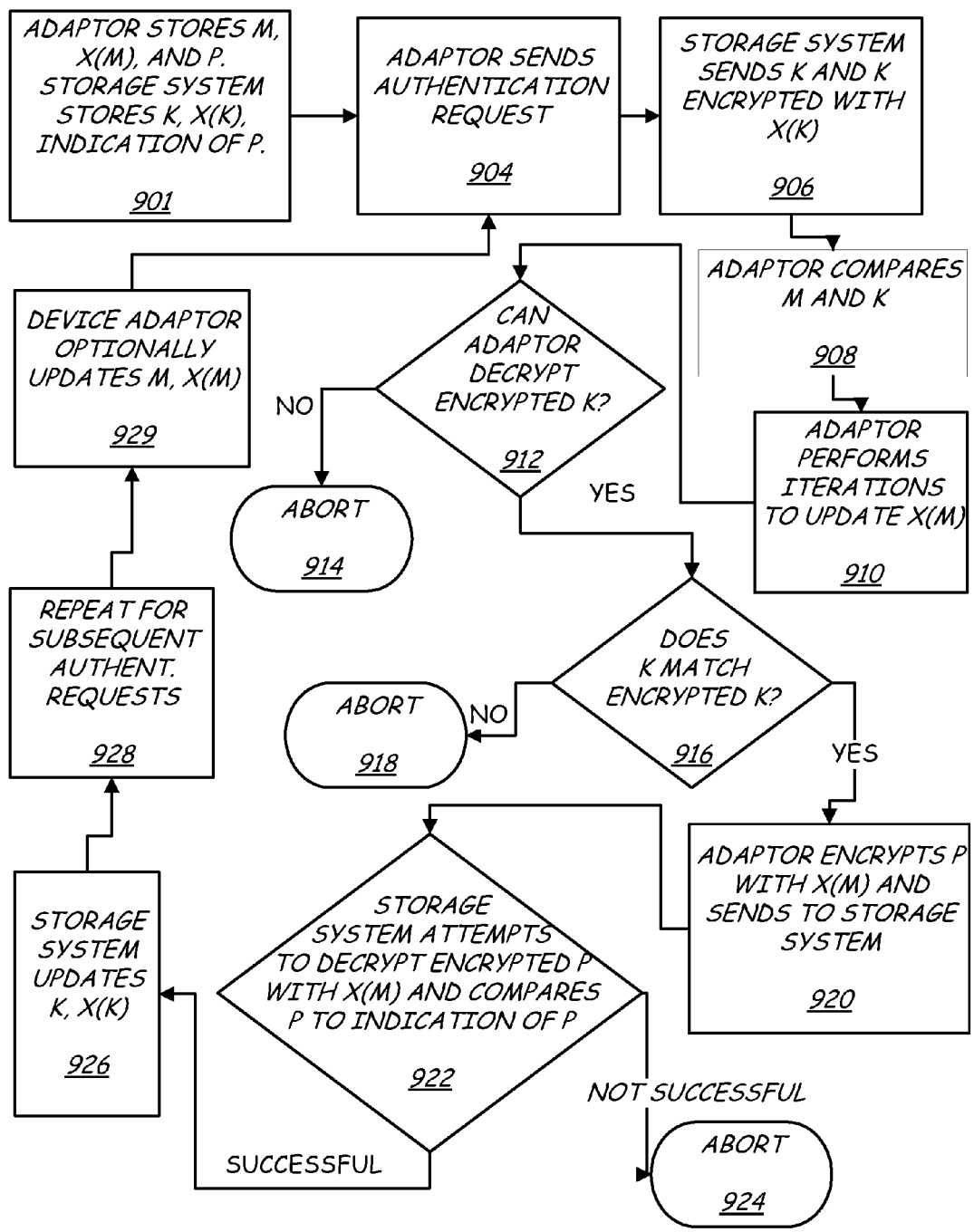
FIG. 9 is a block diagram of a method of securely authenticating a host to a data storage system in which an index is utilized.

FIG. 9 is a block diagram of a method of securely authenticating a host in an environment such as, but not limited to, that shown in FIG. 8. The authentication of a host to a storage system is illustratively managed by a device adaptor. In the embodiments described below, the authentication processes are described in terms of one device adaptor and one storage system. However, it is to be understood that the methods are illustratively used in systems having multiple device adaptors and storage systems such as in the system shown in FIG. 8. Additionally, the process in FIG. 9 is also illustratively used in other environments such as, but not limited to, that shown in FIG. 1. In such a case, the actions characterized as being performed by the device adaptor are instead illustratively performed by a host device/controller.

At block 901, the device adaptor and storage system share and store information in an enrollment or mating phase. The information illustratively includes information that is the same or similar as the information exchanged in the previously described methods. For example, the device adaptor shares an authentication key, P, with the storage system, and the storage system stores a hash value of the authentication key, P. Also for example, the device adaptor and storage system share and store a first key, X1.

In addition to the information previous described as being shared and stored during an enrollment or mating phase, in an embodiment, the device adaptor and storage system also each store an index value. The device adaptor illustratively stores an index m, and the storage system illustratively stores an index k. The indexes m and k illustratively have values that are consecutive positive integers (i.e. 1, 2, 3, 4, 5, 6, etc.). In an embodiment, at the mating phase, both the device adaptor's index m and the storage system's index k are initialized to 1.

Following the first key, X1, the subsequent keys used in the method are illustratively consecutive hash values of the preceding key. The hash values are optionally determined such as, but not limited to, the method described in reference to block 714 in FIG. 7. For example, for illustration purposes only and not by limitation, the second key, X2, is the hash value of X1. The third key, X3, is the hash value of X2. The fourth key, X4, is the hash value of X3, and so on.

In an embodiment, the device adaptor index m corresponds to the key stored by the device adaptor, which is represented by X(m). For example, if m is 1 such as following initialization, then the key is the first key, X1, which is illustratively the random key discussed above. If m is 2, then the key is the second key, X2, which is illustratively the hash value of X1. If m is 3, then the key is the third key, X3, which is illustratively the hash value of X2. This process illustratively continues. For example, if m is 500, then the key is the five hundredth key, X500, which is illustratively the hash value of X499.

Similarly, in an embodiment, the storage system index value k corresponds to the key stored by the storage system, which is represented by X(k). For example, if k is 1 such as following initialization, then the key is the first key X1, which is illustratively the random key discussed above. If k is 2, then the key is the second key, X2, which is illustratively the hash value of X1. This process continues onward as was described in the previous paragraph.

In certain embodiments of systems such as that shown in FIG. 8, the device adaptors are not updated after each authentication session for each storage system. One reason for this, in at least some systems, is that it is relatively expensive to exchange information amongst the device adaptors. Additionally, device adaptors may only have volatile memory causing them to lose information if they lose power or are reset. In one embodiment, key and state information (e.g. m and X(m)) are illustratively permanently and securely stored at a location that is controlled by at least one of hosts 810, and the information is transferred to device adaptors 830 when they are started or restarted. As a consequence of the potential lack of updated information or loss of information, the device adaptor index m and corresponding key X(m) may be lower than the storage system index k and corresponding key X(k). In other words, m is less than or equal to k. As will be clear following the discussion of FIG. 9, the method in FIG. 9 allows for secure host authentication in such an environment.

At block 904, the device adaptor sends an authentication request to the data storage system.

At block 906, the storage system responds to the authentication request received from the data storage system. The storage system illustratively sends a response to the device adaptor that includes the current value of the storage system's index k. The storage system also illustratively encrypts its current index value and includes the encrypted value in the response (i.e. the response includes k and an encrypted k). In an embodiment, the value is encrypted utilizing the storage system's currently stored key, X(k). For instance, following the initialization process described above, the value of k is illustratively 1, and the currently stored key, X1, is illustratively the random key. In such a case, the storage system response illustratively includes the index value 1 and the index value 1 encrypted by the random key.

As will be described below in more detail, in one embodiment, k and the stored key X(k) are updated for each authentication request. Accordingly, in such a case, for the fifth authentication request, the stored value of the index k is 5, and the current key, X5, is the hash value of X4, which is the hash value of X3, which is the hash value of X2, which is the hash value of X1 which is optionally the originally stored random key. In such a case, the storage system response illustratively includes the index value 5 and the index value 5 encrypted by X5.

At block 908, the device adaptor receives the storage system's response to the authentication request. The device adaptor compares the value of k (i.e. the storage system's index) to the value of its index m. As was previously described, the storage system index m is illustratively less than or equal to k. Based at least in part on the comparison, the device adaptor determines how many times it will have to apply a hash function to its key, X(m), to update it so that it is the same as the storage controller's key X(k). In other words, the device adaptor determines how many iterations of hashing its currently stored key, X(m), that it will have to perform. For example, if the storage system's index value k is 10 and the device adaptor's index value is also 10, the comparison of the index values will determine that they are the same. Consequently, the corresponding keys X(k) and X(m) should also be the same, so no iterations are required. Also for example, if k is 10 and m is 7, the device adaptor's comparison will lead to the result that the storage system's index is three authentication request sessions or key iterations ahead of it. In other words, the storage system's key, X(k), is X10, and the device adaptor's key, X(m), is X7. Consequently, the device adaptor will have to perform three iterations to its key, X(k) which is currently X7, to get it to be X10. The device adaptor first determines the hash value of X7 which is X8. The device adaptor then determines the hash value of X8 which is X9. Finally, the device adaptor determines the hash value of X9 which is X10.

At block 910, based upon the comparison of the storage system index k and the device adaptor index m, the device adaptor updates its stored key by iteratively applying the hash function. This is illustratively performed as was described in the preceding paragraph. The device adaptor optionally deletes its previously stored key and stores the updated key. For example, if the device adaptor index m is 7 and the storage device adaptor index k is 10, the device adaptor would delete its stored X7 key and replace it with the X10 key.

At block 912, the device adaptor attempts to decrypt the storage system's encrypted index value k that was sent at block 906. The device adaptor illustratively uses its updated key, X(m). As was previously mentioned at block 906, the index value k is illustratively encrypted with the storage system's stored key, X(k). Accordingly, because X(m) was updated to match X(k) at block 910, the device adaptor should be able to decrypt the encrypted index value (i.e. in symmetric key cryptography, a key is able to decrypt a message that was encrypted with an equivalent key).

If the device adaptor is not able to decrypt the index value at block 912, the method continues to block 914 where the authentication operation is aborted. The device adaptor (i.e. the host) is not authenticated to the storage system, and the device adaptor is not permitted to access the storage system.

If the device adaptor is able to decrypt the index value at block 912, the method continues to block 916. At block 916, the device adaptor compares the unencrypted storage system index value k that was sent at block 906 to the encrypted storage system index value k that was sent at block 906. If the two values do not correspond to each other (e.g. if they are not the same), then the method continues to block 918 where the authentication operation is aborted. If the two values do correspond to each other (e.g. if they are the same), then the method continues to block 920.

At block 920, the device adaptor encrypts the authentication key, P, with X(m) and sends the encrypted authentication key to the storage system. In one embodiment, the authentication key is stored in the device adaptor at block 902. In another embodiment, the device adaptor retrieves or is sent the authentication key from another source such as, but not limited to, a key server, a host computer, or a host adaptor.

At block 922, the storage system attempts to decrypt the encrypted authentication key, P, utilizing X(k). If the storage system is able to decrypt the authentication key, then the storage system compares the authentication key to its stored hash value of the authentication key. If the storage system is not able to decrypt the encrypted authentication key, or if the authentication key does not match the storage system's hash value of the authentication key, the device adaptor is not authenticated and the method is aborted at block 924. If the authentication key sent by the device adaptor matches the hash value (e.g. the device adaptor calculates the hash value of the sent authentication key and it is the same as the stored hash value), then the device adaptor (i.e. the host) is authenticated to the storage system. The storage system optionally sends an "OK" message to the device adaptor that is encrypted with X(k) to notify the storage system that it can proceed with a secure session. The method then continues to block 926.

At block 926, the storage system updates its index k and its key X(k). In an embodiment, the index k is updated by incrementing its value. For example, for illustration purposes only and not by limitation, a set value (e.g. 1) is added to the index value. In an embodiment, the key X(k) is updated by determining the hash value of the currently stored key and then replacing the currently stored key with the hash value. The currently stored key is illustratively permanently erased from the storage system. Also, similar to embodiments of the methods previously discussed, the currently stored key is illustratively stored in volatile memory such that it is erased if power to the system is lost.

At block 928, the method described above is repeated starting at block 904 for subsequent authentication requests.

FIG. 9 also includes an optional block 929. As was previously mentioned, the device adaptor index m and its corresponding key X(m) illustratively are less than or equal to the storage system index k and its corresponding key X(k). As k becomes larger than m, the authentication process may take longer. For example, at block 910, the device adaptor will need to perform more iterations to update its key, X(m) as the difference between k and m increases. The increased amount of iterations illustratively slows the process down. Similarly, the increased amount of iterations also consumes more system resources such as processing power.

At optional block 929, the device adaptor sends a request to a storage device for its k and X(k). The device adaptor illustratively replaces its m and X(m) values with the values that it receives. This may help reduce the extra time and processing power requirements that can occur when k becomes larger than m. In an embodiment, this process occurs based upon a predetermined number of authentication requests. For example, it could happen for every authentication request, for every tenth authentication request, for every one hundredth authentication request, and so on. In another embodiment, this process occurs independently or asynchronously from the other blocks in the method. For example, the process illustratively occurs after a specified time duration/interval or based upon a user request. Embodiments of the present disclosure are not limited to any particular timing or methods of updating m and X(m).

In one embodiment of the method shown in FIG. 9 and of the other methods previously discussed, the device adaptor/host, the storage device, or both generate and transmit simulated (i.e. fake) messages to each other in order to improve security. For instance, in at least some of the embodiments described above, there may be a small time window in which a system is vulnerable to attack. Systems may for example be vulnerable between the time a host sends an authentication request encrypted with a certain encryption key and the storage system decrypts the authentication request with the certain encryption key and then deletes the certain key. During this time, a system attacker could in some circumstances cut the system power, recover the encryption key from the storage system, and then use it to decrypt and recover the authentication key. However, by utilizing simulated messages, systems are better able to hide when they may be vulnerable to attack. In one particular embodiment, a storage device illustratively sends a message that includes a simulated k and an encrypted simulated k. This message corresponds to the message transmitted at block 906. The device adaptor optionally replies to the simulated message with its own simulated message. The device adaptor simulated message illustratively includes a simulated authentication key encrypted with the simulated k. These simulated messages, as described above, may help to improve security by preventing a system attacker from identifying when a storage system may be more vulnerable to an attack (e.g. during a power-cut).

The method shown in FIG. 9 has many of the same or similar benefits as the previously discussed methods. For example, a system attacker cannot recover a key from a stolen storage system that will enable him to decrypt a previously transmitted authentication key. The FIG. 9 method also has additional benefits. For example, it may be possible to implement the FIG. 9 method in different operational environments. For instance, the FIG. 9 method may be used in systems in which the device adaptor/host is not updated with the current status of each storage system (i.e. the device adaptor/host does not have state information for each of the storage systems). Additionally, the FIG. 9 method is also advantageous in that it provides an additional method of generating keys (i.e. the methods described above that utilize index values).

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a data storage device configured to:
  receive an authentication key from the host with a first encrypted authentication request;
  decrypt the first encrypted authentication request based on a first encryption key to authenticate a host;
  compare the authentication key to an indication of the authentication key to further authenticate the host, the indication of the authentication key being a value stored on the data storage device and based on the authentication key;
  generate a second encryption key by performing a hash operation on the first encryption key;
  update an index value based on the successful host authentication, the index value representing a number of hash operations performed to generate the second encryption key; and
  utilize the second encryption key to authenticate the host in a subsequent authentication session.

2. The apparatus of claim 1, the data storage device further configured to:
apply a hash function to the authentication key received with the first encrypted authentication request to generate a second indication of the authentication key; and
compare the second indication of the authentication key to the indication of the authentication key stored on the data storage device to authenticate the host.

3. The apparatus of claim 1, the data storage device further configured to:
exchange information for symmetric key cryptography with the host during a secure enrollment phase, the information including the first encryption key, an authentication key, and an algorithm for data encryption or decryption.

4. The apparatus of claim 3 further comprising:
the host and the data storage device are each configured to generate the second encryption key independently.

5. The apparatus of claim 1, the data storage device further configured to:
receive the second encryption key from the host with the first encrypted authentication request.

6. The apparatus of claim 1, the data storage device further configured to:
transmit the index value in response to a second authentication request received prior to the first encrypted authentication request.

7. The apparatus of claim 6, the data storage device further configured to:
encrypt the index value; and
transmit the encrypted index value and an unencrypted copy of the index value in response to the second authentication request.

8. The apparatus of claim 1 further comprising:
a host controller configured to:
  encrypt a first authentication request with the first encryption key to generate the first encrypted authentication request;
  transmit the first encrypted authentication request to the data storage device;
  encrypt a second authentication request with the second encryption key to generate a second encrypted authentication request; and transmit the second encrypted authentication request to the data storage device.

9. An apparatus comprising:
a host device configured to:
- encrypt a first authentication request with a first key;
- transmit the first authentication request to a data storage device;
- transmit an authentication key to the data storage device with the first authentication request;
- encrypt a second authentication request with a second key;
- transmit the second authentication request to the data storage device;

the data storage device configured to:
- store the first key in a memory of the data storage device;
- utilize the first key to decrypt the first authentication request to authenticate the host device;
- compare the authentication key to an indication of the authentication key to further authenticate the host device, the indication of the authentication key being a value stored on the data storage device and derived from the authentication key;
- generate the second key;
- replace the first key with the second key at the data storage device, the replacement including deleting the first key from the memory and storing the second key to the memory;
- transmit the second key to the host device; and
- utilize the second key to decrypt the second authentication request to authenticate the host.

10. The apparatus of claim 9, the host device further configured to:
- generate the second key; and
- transmit the second key to the data storage device with the first authentication request.

11. The apparatus of claim 9, the host device further configured to:
- receive a first index value from the data storage device, the first index value corresponding to a number of authentication operations performed at the data storage device; and
- generate the first key based at least in part on the first index value.

12. The apparatus of claim 11, the host device further configured to:
- store a second index value, the second index value corresponding to a number of authentication operations involving the host device; and
- generate the first key by performing a number of hash operations on an encryption key stored at the host device based on a difference between the first index value and the second index value.

13. A system comprising:
a data storage device configured to:
- store an initial encryption key as a first encryption key;
- receive an authentication initiation request from a host;
- transmit a first index value and a copy of the first index value encrypted with the first encryption key to the host, the first index value corresponding to a number of authentication operations performed at the data storage device;
- receive a host authentication key and an encrypted authentication request from the host;
- decrypt the encrypted authentication request using the first encryption key to authenticate the host;
- compare the host authentication key to an indication of the host authentication key to further authenticate the host, the indication of the host authentication key being a value stored on the data storage device and based on the host authentication key on a successful host authentication operation:
- increment a current index value, starting with the first index value;
- perform a hash algorithm on a current encryption key starting with the first encryption key to generate a second encryption key, where the current index value corresponds to a number of hash iterations of the current encryption key; and
- store the second encryption key for use in a subsequent authentication operation.

14. The system of claim 13 further comprising:
the data storage device further configured to:
- exchange information with the host during an enrollment phase, the information including an initial index value, the initial encryption key, and the hash algorithm to perform on encryption keys to establish symmetric key encryption.

15. The system of claim 14 further comprising:
the information further includes an initial host authentication key;
the data storage device further configured to:
- perform a hash operation on the initial host authentication key to produce the indication of the host authentication key;
- receive the host authentication key with the encrypted authentication request; and
- perform the hash operation on the host authentication key and compare the result to the indication of the host authentication key to further authenticate the host.

16. The system of claim 13 further comprising:
the host including:
- a host controller;
- an intermediary adapter device configured to manage authentication operations between the host controller and the data storage device, including:
  - transmitting the authentication initiation request;
  - receiving the first index value and the encrypted first index value;
  - determining a difference between the first index value and a second index value stored at the host, the second index value corresponding to a number of authentication operations tracked by the host;
  - performing a number of hash algorithms on a current host encryption key based on the difference, the current host encryption key representing the initial encryption key hashed a number of times based on the second index value;
  - decrypting the encrypted first index value using the hashed current host encryption key and comparing to the first index value to verify the correct current host encryption key;
  - transmitting the encrypted authentication request encrypted with the current host encryption key to the data storage device.

* * * * *